Feb. 13, 1923.
W. G. COX
1,445,005
ATTACHMENT DEVICE FOR VEHICLE BUMPERS AND BUMPER BRACKETS
Filed Nov. 13, 1922
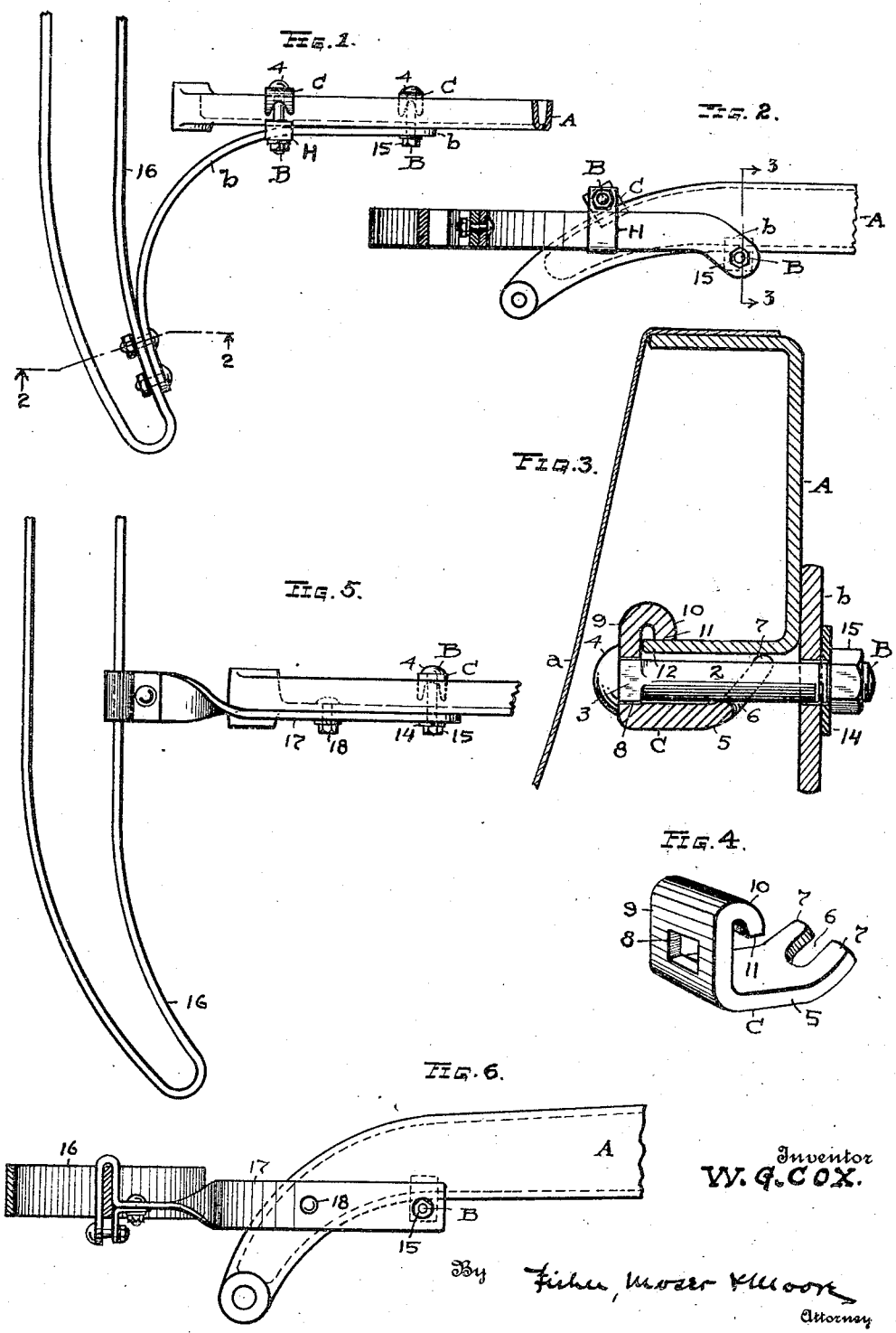
Inventor
W. G. COX.
By Fisher, Moser & Moore
Attorney Patented Feb. 13, 1923.

1,445,005

UNITED STATES PATENT OFFICE.

WILLIAM G. COX, OF CLEVELAND, OHIO, ASSIGNOR TO COX BRASS MANUFACTURING COMPANY, OF ALBANY, NEW YORK, A CORPORATION OF NEW YORK.

ATTACHMENT DEVICE FOR VEHICLE BUMPERS AND BUMPER BRACKETS.

Application filed November 13, 1922. Serial No. 600,528.

*To all whom it may concern:*

Be it known that I, WILLIAM G. COX, a citizen of the United States, residing at Cleveland, in the county of Cuyahoga and State of Ohio, have invented certain new and useful Improvements in Attachment Devices for Vehicle Bumpers and Bumper Brackets, of which the following is a specification.

My invention relates to an improvement in attachment devices for vehicle bumpers and bumper brackets, and the improvement resides in the simple clip and bolt device herein shown and described and more concisely pointed out in the claims.

In the annexed drawing, Fig. 1 is a plan view of a portion of a chassis frame and a spring bar bumper affixed thereto by means of a pair of my devices, and Fig. 2 is a side view of the same parts. Fig. 3 is an enlarged cross section of the channeled frame and the fastening device on line 3—3 of Fig. 2. Fig. 4 is a perspective view of the clip itself. Fig. 5 is a plan view, and Fig. 6 a side view and section of a modified form of bumper supporting arm affixed to the frame by a bolt and one of my devices.

Various devices are used to secure a bumper or a bumper supporting member upon a vehicle frame, but as nearly all automobile frames possess channeled side members A a common practice is to use hook bolts, U-bolts, and supplemental devices, in making such attachments. The present invention involves instead, the use of a straight carriage bolt B and an angle iron clip C used together in such a way that a rigid non-turning clamping connection may be effected quickly and conveniently to any channel iron frame, and in which the clip itself will support and align the bolt when connected loosely or tightly, to the frame. The clip is also particularly designed to facilitate the use of a bolt where the room or space to make the connection is crowded or limited especially at the inner open side of the channel where it is customary to cover the channel with a splash pan or apron. Thus, bolt B is of a common type possessing a round screw-threaded shank 2, a square neck 3, and a rounded head 4. Clip C consists of a short angle-iron section having a relatively long forked flange 5 bent upwardly at its free extremity at an angle of about forty-five degrees, the notch 6 extending downwardly to the bend, and the bent extremities providing two upwardly-extending bearing fingers 7—7 at equi-distant points from the medial line of the slot. A square opening 8 is formed in the vertical flange 9 of the clip directly opposite and in line with notch 6 to receive the square neck 3 of the bolt when the round shank of the bolt extends through and rests in the slot between the two bearing or contact fingers 7—7. The upper free extremity of the vertical flange 9 of the clip is turned inwardly and downwardly to provide an overhanging lip or lateral projection 10 having a straight end edge 11 lying in a slightly higher horizontal plane than the end edges of the two fingers 7—7 and parallel with said end edges.

As shown, lip 10 is rounded and curled downwardly and is also relatively short to permit this portion of the clip to be easily inserted upwardly in a very small space between the end edge of the bottom flange 12 of the channel A and the depending apron $a$, see Fig. 3, into seating and seizing position upon flange 12. If tension is now applied to bolt B the lip 10 becomes the fulcrum of a movement which causes the two bearing fingers to contact with the bottom side of flange 12, thereby clamping the clip rigidly to the flange, and the bolt may rest eventually upon the horizontal flange of the clip between the two fingers. The straight edge 11 and the two fingers 7—7 clamp the clip squarely against the flat surfaces of the flange and the clip may be relatively narrow and still effect such square seating engagement. In this way the strain and weight carried by the clip and imposed on flange 12 are distributed over a wide area and an effective lock and fastening obtained which is capable of sustaining heavy weights and severe shocks and blows without injury to the frame.

In using this device for attaching a bumper arm $b$ or other bracket member to the channel member A, the screw-threaded end of the bolt may pass through an opening in the arm or bar $b$ as shown in Fig. 3, and a lock-washer 14 and nut 15 used to draw up the bolt and clamp the arm or bar flatwise against the vertical outer face of channel member A. A similar bolt and clip attachment may be made for a hanger H for the arm or bracket of a bumper, as shown in Figs. 1 and 2, where the upper flange of the channel member A is also engaged by a clip C and the bolt B passes through the upper end of a hanger H for the supporting arm b of the bumper 16. In this case the hanger is clamped rigidly to the channel member and the arm clamped rigidly within the hanger by the same bolt and nut. In Figs. 5 and 6, a bracket 17 made of a flat bar is bolted at one side of the channel member by means of a bolt 18 which passes through said member, and also a bolt B and clip C as herein described.

What I claim, is:

1. A means for attaching a bumper or bumper supporting part to a channeled side member of an automobile, comprising an angle member having bent extremities adapted to engage the top and bottom surfaces of one flange of said channeled side member, and a bolt extending transversely of said angle member intermediate said bent extremities.

2. A means for attaching a bumper or bumper supporting part to a channeled side member of an automobile, comprising an angle iron having the extremity of one of its flanges bent inwardly to provide a fulcrum clamping rest and having the extremity of its other flange bent and forked to provide spaced bearing parts.

3. A device for attaching a bumper or bumper supporting part to a channeled automobile chassis frame, comprising an angle member having vertical and horizontal flanges, said vertical flange having a bolt opening therein and a lateral lip at its extremity, and said horizontal flange having its extremity bent toward the axis of said opening.

4. A device for attaching a bumper or bumper supporting part to a channeled side member of an automobile frame, comprising an angle member having a vertical flange with a square opening therein and its free end bent into a lip, and a horizontal flange bent upwardly at its extremity and slotted, in combination with a square necked bolt extending through said opening and projected through said slotted extremity.

5. A device for attaching a bumper or bumper supporting member to a flanged member of an automobile, comprising a right-angled clip having a short curled lip extending inwardly at the end of one of its angular sides and an opening in said side and the connecting angular side being forked and bent upwardly opposite said opening, in combination with a bolt extending through said opening and the forked end of said clip.

6. In combination, a side member of an automobile frame, having a horizontal flange, with a clip having a short lip adapted to fulcrum upon the upper side of said flange and a longer forked portion adapted to bear against the bottom of the flange, a screw-threaded bolt connected with said clip extending transversely of said flange through said forked bearing portion, and a nut for said bolt, said clip and bolt and nut being adapted to secure a bumper part rigidly to said side member.

In testimony whereof I affix my signature.

WILLIAM G. COX.